(No Model.)
C. B. BEARDSLEY.
LATHE ATTACHMENT.
No. 493,008. Patented Mar. 7, 1893.
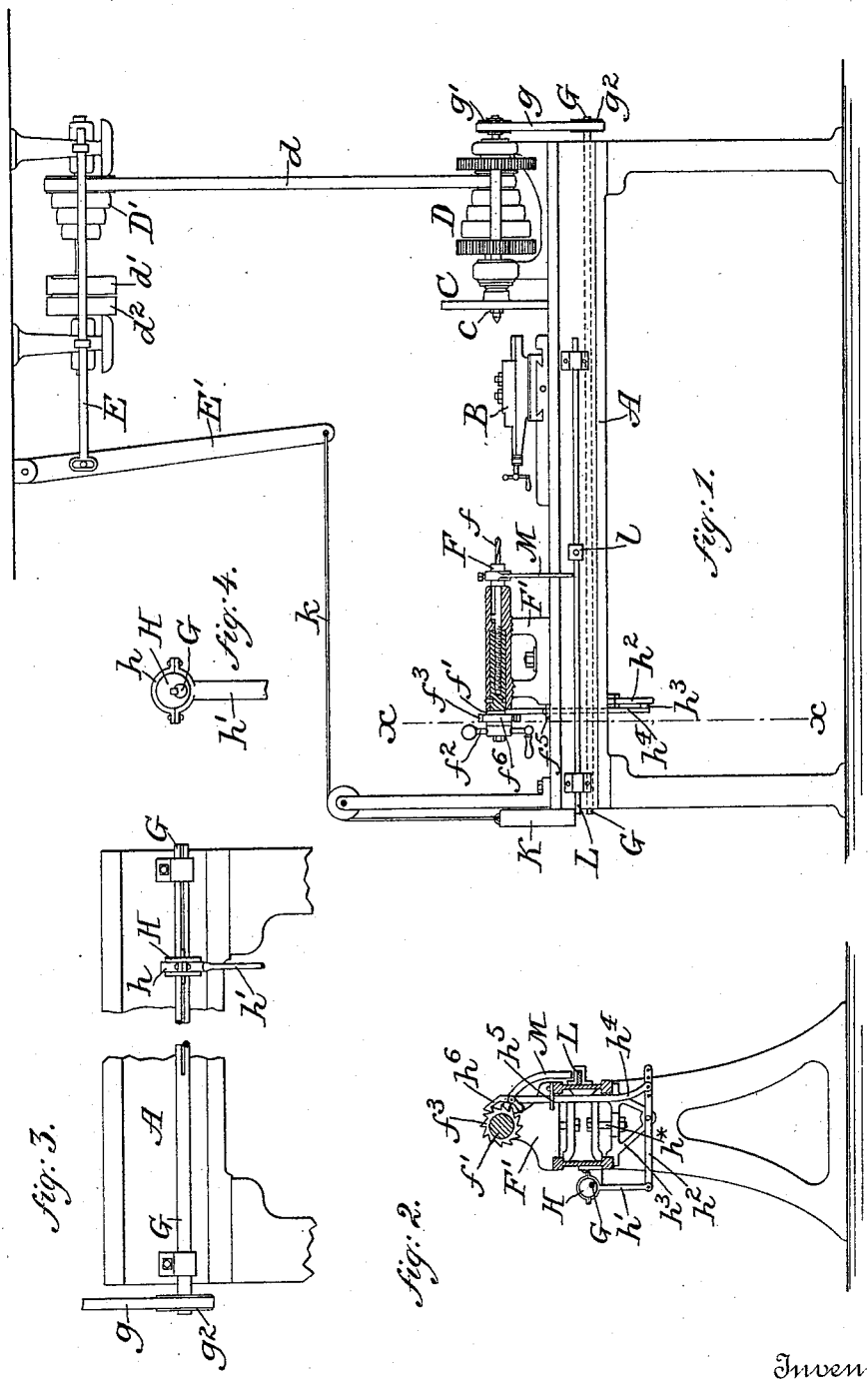
Witnesses
F. Petri-Palmedo
A. N. Jesbera
Inventor
Charles B. Beardsley
by William B. Greeley
Atty

UNITED STATES PATENT OFFICE.

CHARLES B. BEARDSLEY, OF NEW YORK, N. Y.

LATHE ATTACHMENT.

SPECIFICATION forming part of Letters Patent No. 493,008, dated March 7, 1893.

Application filed July 12, 1892. Serial No. 439,791. (No model.)

*To all whom it may concern:*

Be it known that I, CHARLES B. BEARDSLEY, of the city, county, and State of New York, have invented a new and useful Improvement in Lathe Attachments; and I do hereby declare that the following is a full and exact description thereof, reference being had to the accompanying drawings, and to the letters of reference marked thereon, making a part of this specification.

The object of my invention is to enable an ordinary power or small engine lathe to be used as an automatic drill without increasing largely the cost of the lathe.

To this end my invention consists in the improved construction and arrangement hereinafter described and claimed.

In the drawings: Figure 1 is a rear elevation of a lathe fitted with my improvement. Fig. 2 is a vertical section on the line $x$—$x$ of Fig. 1. Fig. 3 is a broken detail view of the opposite side of the lathe from that shown in Fig. 1. Fig. 4 shows a detail to be referred to.

The lathe-bed A, slide-rest B, head-stock C, mandrel $c$, cone-pulley D and D′, belt $d$, fast and loose pulleys $d'$ and $d^2$, belt-shipper E, and shipper lever E′, may be all as usual or as preferred.

The back spindle F of the adjustable tail-stock F′ is adapted to receive a drill $f$ and is formed as usual or as preferred to be advanced without rotation. For this purpose it may be screw-threaded and engaged by a rotatable nut $f'$. The nut may have affixed thereto the usual handle $f^2$ and has also a toothed wheel $f^3$ which is advanced step by step. The mechanism I have shown for this purpose comprises an ordinary feed shaft G supported at the side of the lathe-bed and driven by a belt $g$ and pulleys $g'$ and $g^2$ from the head-stocks. Splined upon the shaft G, so as to be capable of sliding thereon while being rotated therewith, is an eccentric H. The strap $h$ of the eccentric is connected by the rod $h'$ with one end of a lever $h^2$ which is pivoted upon a bracket $h^3$ adjustable lengthwise upon the lathe-bed. To the other end of the lever $h^2$ is connected a rod $h^4$ which is guided by an adjustable, slotted arm $h^5$ and carries at its upper end a pawl $h^6$ for engagement with the toothed wheel $f^3$.

The shipper-lever E′ is adapted to be operated, through a cord $k$ and weight K which is supported normally by a bar L adapted to slide in suitable bearings. The bar has adjustably secured thereon a block $l$ adapted to be struck by an arm M which is moved forward as the drill is advanced and may be fixed to the back-spindle itself. The device just described thus constitutes a detent for the shipper operating means.

When an ordinary lathe is used for drilling the constant attention of an operator is necessary to feed the drill and to stop the lathe when the hole is drilled to the required depth. With my improvement, however, which may be applied to a lathe at little extra expense, the operator is free to attend to other matters after he has placed the work in the lathe and has fixed the block at the point corresponding to that at which the operation of the drill should cease. The drill is fed forward by the mechanism described with much more uniformity than could be attained by the operator himself and when the drill has advanced far enough the arm M will strike the block $l$, and will thereby move the bar L to release the weight K and so shift the belt to the loose pulley. As the tail-stock is shifted on the ways of the lathe-bed to suit the requirements of the work, the bracket $h^3$, which supports the lever $h^2$, may also be adjusted by loosening the bolt $h$ and the eccentric may also be moved along the shaft G to a corresponding position. The slotted guide-plate $h^5$ will at the same time be shifted to a new position. As an attachment, therefore, my improvement may be readily applied to any lathe and may be used without interfering in the least with the ordinary uses of the lathe itself.

It is obvious that the drill might be carried by the mandrel $c$ and that the back-spindle might be made to bear against and advance the slide-rest to which, in such case, the work would be secured.

I claim as my invention—

1. The combination with a lathe-bed having ways, and a head-stock, of a tail-stock adjustable on said ways, a back-spindle carried by said tail-stock, a rotatable nut for advancing said spindle, gearing for rotating said nut and adjustable with the tail-stock, and means as described for driving said gearing from the head-stock, substantially as shown and described.

2. The combination with a lathe-bed having ways, and a head-stock, of a tail-stock adjustable on said ways, a back spindle carried by said tail-stock, a rotatable nut for advancing said spindle, gearing for rotating said nut and adjustable with the tail stock, means for driving said gearing, a belt-shipper, means for operating the same, a detent therefor and means between said spindle and said detent to withdraw the latter, substantially as shown and described.

3. An attachment for lathes comprising a shaft extending longitudinally of the lathe-bed, an eccentric splined thereon, a bracket adjustable upon the lathe-bed, a lever pivoted on said bracket, a connecting rod between said eccentric and lever, a pawl-carrying rod connected to said lever, and a toothed wheel driven by said pawl carrying rod and adapted to advance the back spindle of the lathe, substantially as shown and described.

In testimony whereof I have signed my name to this specification in the presence of two subscribing witnesses.

CHARLES B. BEARDSLEY.

Witnesses:
A. N. JESBERA,
A. WIDDER.